Oct. 19, 1948.  J. HOCHWARDER  2,451,733
WORK POSITIONER
Filed Nov. 29, 1945
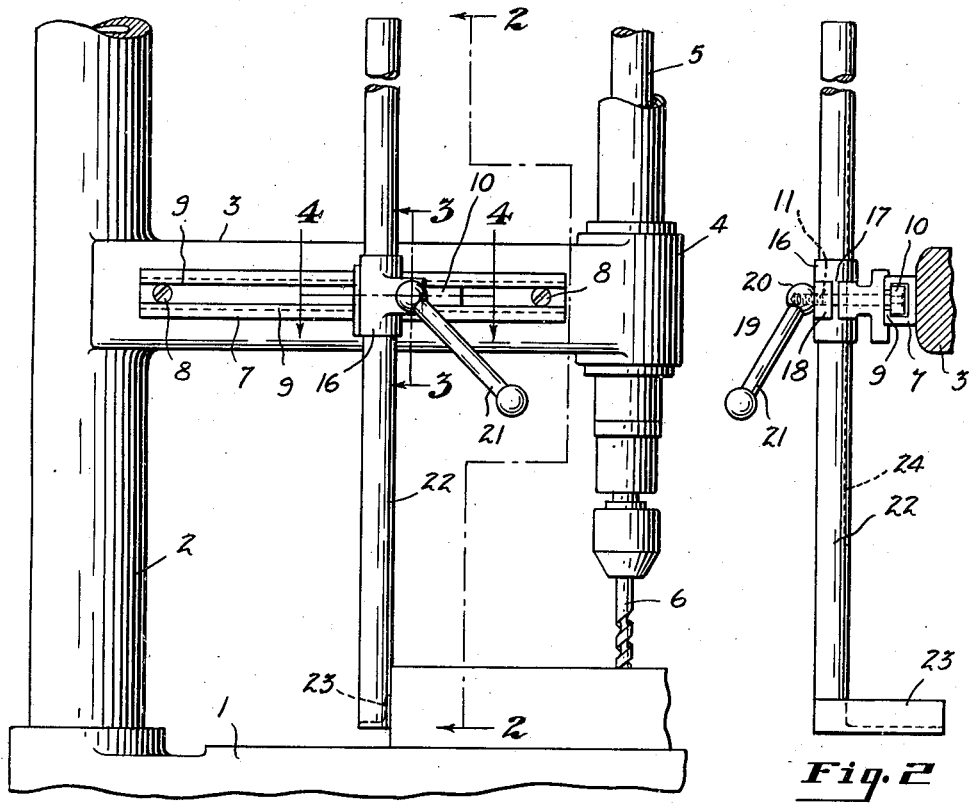
Fig. 1
Fig. 2
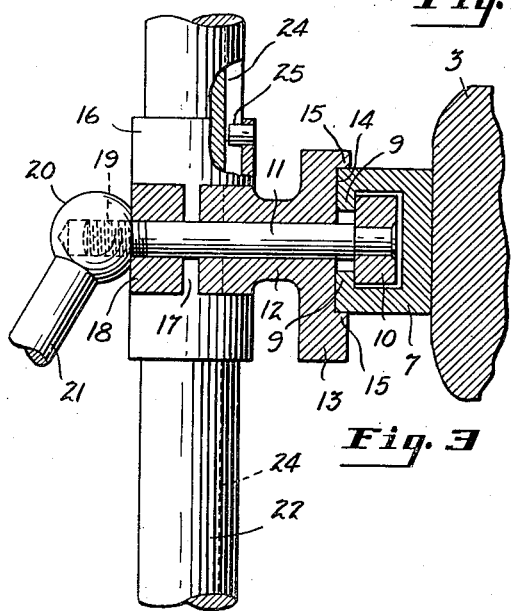
Fig. 3
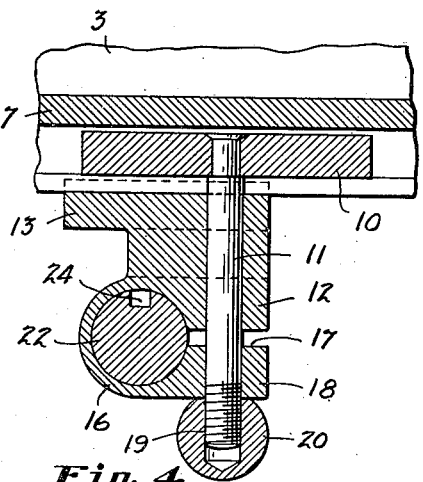
Fig. 4
INVENTOR.
John Hochwarder
BY
Evans + McCoy
ATTORNEYS Patented Oct. 19, 1948

2,451,733

UNITED STATES PATENT OFFICE 2,451,733

WORK POSITIONER

John Hochwarder, Cleveland, Ohio

Application November 29, 1945, Serial No. 631,534

1 Claim. (Cl. 248—121)

This invention relates to an adjusting device and particularly to a device for adjusting a work positioning member associated with a drill press.

The invention has for its object to provide an adjustable mounting that will permit adjustment of a member along either or both of two crossing linear paths and in which the member is held in adjusted position by a single clamp.

More specifically it is an object of the invention to provide a mounting in which a work positioning member is slidably mounted in a holder that is mounted to slide along a guide member and in which the holder is clamped to the guide member and the positioning member is clamped to the holder by actuation of a single manually operable clamping member.

With the above and other objects in view, the invention may be said to comprise the device as illustrated in the accompanying drawings, hereinafter described and particularly set forth in the appended claim, together with such variations and modifications thereof as will be apparent to one skilled in the art to which the invention pertains.

Reference should be had to the accompanying drawings forming a part of this specification, in which:

Figure 1 is a side elevation of a drill press showing the invention applied thereto;

Fig. 2 is a section taken on the line indicated at 2—2 in Fig. 1, showing the work positioning member in side elevation;

Fig. 3 shows on an enlarged scale a section taken on the line indicated at 3—3 in Fig. 1, and Fig. 4 is a view on an enlarged scale showing a section taken on the line indicated at 4—4 in Fig. 1.

In the accompanying drawings the invention is shown applied to a drill press having a work supporting bed 1, a standard 2 carrying an arm 3 that extends horizontally above the bed and which has a vertical bearing portion 4 at its outer end in which there is mounted a spindle 5 to which a suitable tool such as a drill 6 may be attached.

The adjusting device of the present invention is shown applied to the spindle carrying arm 3, to one side of which there is attached a guide bar 7 which is secured to the arm 3 by suitable means such as screws 8. The guide bar 7 is of channel form provided with inturned flanges 9 which provide an undercut channel to receive a sliding head 10 to which a laterally projecting bolt 11 is rigidly attached.

A holder 12 has a base portion 13 grooved to fit upon the guide bar 7, the base portion 13 having a flat face 14 that bridges the channel of the bar 7 and bears against the outer face thereof, the groove in the base portion 13 providing flanges 14 and 15 that engage opposite side edges of the bar 7.

The holder has an integral, vertically disposed clamping sleeve 16 that is formed integrally therewith at one end, the sleeve 16 providing a cylindrical vertical opening in the holder and having a vertical slot 17 extending throughout the length thereof to permit contraction of the sleeve for clamping purposes. The sleeve 16 extends above and below the body of the holder 12 and the slot 17 which is parallel to the face 14 of the holder extends through the outer portion of the holder 12 so as to form a clamping flange 18 overlying the body of the holder and spaced therefrom in position to receive the bolt 11 which extends through the holder 12 and flange 18. The outer end of the bolt 11 has a threaded portion 19 which receives a clamping nut 20 that engages the outer face of the flange 18 and that has a laterally extending handle 21 by means of which it may be turned to exert pressure on the outer face of the flange 18.

A vertically disposed work adjusting member in the form of a cylindrical bar 22 fits in the sleeve 16 and is provided at its lower end with an angle shaped foot piece 23 that extends at right angles thereto for engagement with the work piece that is to be positioned on the bed 1. If it is desired to hold the foot piece square with the bed the bar 22 may be provided with a longitudinal groove 24 and the holder 12 with a pin 25 that engages in the groove to hold the bar 2 against turning movements in the holder. When the nut 20 is loosened the bar 22 is free to move endwise in the sleeve 16 and the holder 12 is free to move lengthwise of the guide bar 7, so that the work engaging foot piece 23 may be moved manually to the desired adjusted position where it may be secured by actuation of the nut 20. When the nut 20 is tightened the bar 22 is clamped in the holder and the holder is simultaneously clamped to the bar 7, the flanges 9 of which are gripped between the elongated head 10 and the inner face 14 of the base portion of the holder to securely hold the work positioning member in adjusted position.

It is to be understood that variations and modifications of the specific devices herein shown and described for purposes of illustration, may be made without departing from the spirit of the invention.

What I claim is:

A combination with a vertical standard, an arm extending horizontally from the standard having a vertical spindle bearing portion at its outer end, said arm having a longitudinal undercut channel in a side face thereof, an adjusting device comprising a holder having a rigid base portion overlying said channel and grooved to slidably receive said arm, said holder having an integral portion extending outwardly from the base and provided with a vertical opening through it adjacent its outer end and a vertical slot extending the length of the opening at one side to provide a clamping flange normally spaced from the body of the holder, a head slidable in said channel, a bolt attached to the head and extending through said base, outwardly extending portion and clamping flange, a work positioning member having a stem slidable in said opening, and a nut threaded on the outer end of the bolt and engaging said clamping flange.

JOHN HOCHWARDER.

REFERENCES CITED

The following references are of record in the file of this patent:

UNITED STATES PATENTS

| Number | Name | Date |
|---|---|---|
| 620,848 | Jerome | Mar. 7, 1899 |
| 1,840,216 | Tormo | Jan. 5, 1932 |
| 2,124,006 | Parker | July 19, 1938 |